United States Patent
Rusnak et al.

(10) Patent No.: US 9,560,734 B2
(45) Date of Patent: Jan. 31, 2017

(54) DENSE PLASMA FOCUS (DPF) ACCELERATED NON RADIO ISOTOPIC RADIOLOGICAL SOURCE

(75) Inventors: Brian Rusnak, Livermore, CA (US); Vincent Tang, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1473 days.

(21) Appl. No.: 12/710,225

(22) Filed: Feb. 22, 2010

(65) Prior Publication Data

US 2010/0215136 A1 Aug. 26, 2010

Related U.S. Application Data

(60) Provisional application No. 61/154,149, filed on Feb. 20, 2009.

(51) Int. Cl.
*H05H 1/40* (2006.01)
*H05H 3/06* (2006.01)
*H05H 1/06* (2006.01)

(52) U.S. Cl.
CPC *H05H 3/06* (2013.01); *H05H 1/06* (2013.01)

(58) Field of Classification Search
USPC .................................. 376/141, 145
See application file for complete search history.

(56) References Cited

U.S. PATENT DOCUMENTS 3,170,841 A * 2/1965 Post .............................. 376/123
6,815,700 B2 11/2004 Melnychuk et al.

OTHER PUBLICATIONS

Moo, S.P., et al., "An Investigation of the Ion Beam of a Plasma Focus Using a Metal Obstacle and Deuterated Target", IEEE Transactions on Plasma Science, vol. 19, No. 3, Jun. 1991.*
Bernard, et al., "Structure of current sheath and fast-particle beams in the focus experiment," Proc. Berchtesgaden Conf. Plasma Physics and Controlled Nuclear Fusion Research, IAEA-CN-35/E18-4 (1977).*
Chadwick, "Possible Existence of a Neutron," Nature, Feb. 27, 1932, p. 312.*
Autin, et al., "A Z-pinch Plasma Lens for Focusing High-Energy Particles in an Accelerator," IEEE Transactions on Plasma Science, vol. PS-15, No. 2, 226-237 (1987).*
Bernard, et al., "The Dense Plasma Focus—A High Intensity Neutron Source", Nuclear Instruments and Methods, 145, pp. 191-218 (1977).

(Continued)

*Primary Examiner* — Sean P Burke
(74) *Attorney, Agent, or Firm* — James S. Tak

(57) ABSTRACT

A non-radio-isotopic radiological source using a dense plasma focus (DPF) to produce an intense z-pinch plasma from a gas, such as helium, and which accelerates charged particles, such as generated from the gas or injected from an external source, into a target positioned along an acceleration axis and of a type known to emit ionizing radiation when impinged by the type of accelerated charged particles. In a preferred embodiment, helium gas is used to produce a DPF-accelerated He2+ ion beam to a beryllium target, to produce neutron emission having a similar energy spectrum as a radio-isotopic AmBe neutron source. Furthermore, multiple DPFs may be stacked to provide staged acceleration of charged particles for enhancing energy, tunability, and control of the source.

10 Claims, 7 Drawing Sheets

(56) References Cited

OTHER PUBLICATIONS

Decker, et al., "Plasma Focus Devices", Physica 82C, pp. 155-164 (1976).
Hansen, "Neutrons and Neutron Generators", The Bell Jar, vol. 6, No. 3/4, 9 pages (1997).
Pouzo, et al., "Applications of the Dense Plasma Focus to Nuclear Fusion and Plasma Astrophysics", IEEE Transactions on Plasma Science, vol. 31, No. 6, pp. 1237-1242 (Dec. 2003).
Soto, "New Trends and Future Perspectives on Plasma Focus Research", Institute of Physics Publishing, Plasma Physics Control Fusion 47, pp. A361-A381 (2005).
Gribkov, et al., "Summary of the 16th Annual IAEA Technical Meeting on Research using Small Fusion Devices", Institute of Physics Publishing and International Atomic Energy Agency, Nuclear Fusion, pp. 868-874 (2006).

* cited by examiner

DENSE PLASMA FOCUS (DPF) ACCELERATED NON RADIO ISOTOPIC RADIOLOGICAL SOURCE

CLAIM OF PRIORITY IN PROVISIONAL APPLICATION

This application claims priority in provisional application filed on Feb. 20, 2009, entitled "Dense Plasma Focus as an Alternative to a Radioactive AmBe Source" Ser. No. 61/154,149, by Brian Rusnak et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiological sources, and more particularly to a non-radio-isotopic radiological source using a dense plasma focus (DPF) to accelerate charged particles into an ionizing radiation-producible target to produce ionizing radiation, e.g. alpha particles ($He^{2+}$) into a beryllium target for neutron emission having energy spectra similar to an americium-beryllium (AmBe) neutron source.

BACKGROUND

Radio-isotopic radiological sources produce relatively constant fluxes of desired radiation (i.e. ionizing radiation) such as alpha, beta, gamma rays, and even neutron emission, through radioactive decay of specific radioactive isotopes in the source. These radio-isotopes are typically created from the irradiation of stable elements in nuclear reactors or accelerators beamlines, or are by-products of fission reactions in reactors. By mating such radio-isotopes with targets, radio-isotopic neutron sources can be created. For example, AmBe neutron sources consist of radioactive americium-241 ($^{241}Am$) isotope material mixed with a beryllium-9 ($^{9}Be$) target material. $^{241}Am$ produces ~5 MeV alpha particles as part of its decay process, or $He^{2+}$ ions, which impinge on the beryllium nuclei and produces isotropic ~1 to 5 MeV neutrons through the $^{9}Be(\alpha, n)^{12}C$ nuclear reaction. AmBe sources typically produce $10^6$ n/s or greater using ~Ci level or higher of $^{241}Am$, and are commonly used in the well logging industry for characterizing and assessing (via neutron activation analysis) the geology surrounding exploratory boreholes in oil drilling and mining operations. Other alpha emitters, such as $^{210}Po$ have also been used with beryllium targets for neutron production. And some other examples of radio-isotopic radiological sources include $^{137}Cs$, $^{60}Co$, $^{192}Ir$ (in the ~kCi or higher range) which are MeV level gamma ray emitters (through radioactive decay) which can be use for example for radiotherapy and cancer treatment, or for sterilization of foodstuffs and equipment. Generally, while such radio-isotopic radiological sources have the advantage of a long useful life, they cannot be turned off, and as such require the source be contained in bulky shielding. For example $^{241}Am$ has a half-life of 458 years, and Californium-252 ($^{252}Cf$), another typical neutron source, has a half-life of about 2.6 years. In addition, radio-isotopic neutron sources in general cannot be pulsed, and the energy spectrum of the emitted neutrons is broad and peaks at energies below the threshold for some important reactions. Radio-isotopic radiological sources also raise concerns regarding the potential dispersal of spent-and-discarded or stolen radio-isotopic neutron sources by terrorist activity.

One common type of non-radio-isotopic neutron source solution, known as "neutron generators," are small neutron source devices which fuse isotopes of hydrogen together using a compact linear accelerator. The fusion reactions take place in these devices by accelerating deuterium, tritium, or mixture thereof into a metal hydride target which also contains deuterium, tritium or mixture. Fusion of deuterium atoms (D-D reaction) results in the formation of a He-3 ($^{3}He$) ion and a neutron with a kinetic energy of approximately 2.5 MeV. Fusion of a deuterium and a tritium atom (D-T reaction) results in the formation of a He-4 ($^{4}He$) ion and a neutron with a kinetic energy of approximately 14.1 MeV. Typically, a low gas pressure cold cathode ion source utilizing crossed electric and magnetic fields, known as a Penning ion source, is used to generate the deuterium, tritium, or mixture in these LINAC-based neutron generators. Ions generated by the Penning ion source are accelerated by the potential difference between an exit cathode and an accelerating electrode into the tritium or deuterium target to emit neutrons. The target is typically a thin film of a metal such as titanium, scandium, or zirconium which, when combined with hydrogen or its isotopes, forms stable metal hydrides having two hydrogen (D or T) atoms per metal atom and allows the target to have extremely high densities of hydrogen. While this approach is known to produce high levels of neutrons (e.g. $10^9$ n/s), the neutron energy spectrum is much harder and substantially different than the AmBe spectrum (~1-5 MeV range), and therefore produces different responses from materials when compared to interrogation using AmBe neutrons, which would effectively render inapplicable the extensive industry knowledge base of subsurface strata gained from AmBe sources.

Another known type of non-radio-isotopic neutron source solution is also based on the D-D or D-T fusion reaction, but uses a dense plasma focus (DPF) in a deuterium or deuterium-tritium gas medium to faun D-D or D-T fusion neutrons by electromagnetic acceleration and compression of intense z-pinch plasma, i.e. a column of hot, compressed plasma formed at an anode tip and along a z-axis of the DPF. FIG. 1 illustrates a cross-section view of a typical DPF-based D-D neutron source known in the art, generally indicated at reference character 10, and having a typical Mather-type DPF configuration comprised of an open-ended coaxial head or gun having a center/inner anode 11 and a coaxial outer cathode 12 separated by a coaxial insulator 13. DPF dimensions may be, for example, approximately 1-10 cm long and 1-10 cm diameter. A deuterium fill gas at the Ton level is normally used. And a moderate to high-power pulse foaming network (PFN) made of fast capacitors with energy ranges in the ~100 J to 1 Mj range, generally represented by the simple circuit 14, drives the plasma and the pinch effect at the anode tip.

During DPF operation, plasma current sheets in a coaxial configuration are first formed from flashover breakdown along insulator surfaces on the center/inner anode 11 and accelerated forward towards the open end through J×B forces. At the open end of the coaxial gun, the sheets expand and collide to form a ~cm long high density ($n_e$~$10^{19}$-$10^{20}$/cc, $T_e$~1-10 keV) z-pinch plasma on the tip of the center/inner anode. In this region, the z-pinch is typically confined for ~100 ns and intense x-rays, ion, and electron beams are generated through a complex combination of non-linear instabilities and other mechanisms that result in effective acceleration gradients of ~100 MV/m. In particular, ion and electron beams are axially emitted in opposite directions during the pinch.

FIG. 1 illustrates the sequence of plasma sheath dynamics, labeled from (I) to (IV) leading to z-pinch formation and D-D neutron formation and acceleration. In particular, an initial plasma sheath (I) forms from a flashover of the coaxial insulator 13, then plasma sheaths (II) and (III) accelerate forward along the central anode toward the anode tip during the rundown phase, and when it reaches the tip end of the anode the sheath axisymetrically collapses at (IV) during the runover phase to form the centimeter-scale fast z-pinch on axis, shown as circle 15, at the tip of the center anode 11. D-D neutron output is shown at arrow 16 originating from the z-pinch, and axially emitted along the z-axis due to the acceleration gradient. D-D neutron outputs up to $\sim 10^{12}$ in a ~100 ns long pulse have been demonstrated, giving high peak neutron rates of $\sim 10^{19}$ n/s with average rates up to $\sim 10^{12}$ n/s using a 1 Hz repetition rate. However, and similar to neutron generators, DPF based D-D neutrons produce different responses from materials when compared to interrogation using AmBe neutrons, which would again effectively render inapplicable the extensive industry knowledge base of subsurface strata gained from AmBe sources. Moreover, they are not tuned for acceleration, use only D-D or D-T for neutrons, and do not provide multi-staging of z-pinch focusing.

It would be advantageous to provide a non-radio-isotopic radiological source, such as a neutron source, that is based on pulsed DPF acceleration of charged particles to strike an ionizing-radiation producible target, e.g. alpha particles ($He^{2+}$) into a beryllium target for neutron emission having energy spectra similar to an americium-beryllium (AmBe) neutron source. Moreover, it would be advantageous to provide a DPF-accelerated non-radio-isotopic radiological source capable of multi-staging dense plasma z-pinch focusing to enhance acceleration energies, tuning, and control.

SUMMARY OF THE INVENTION

One aspect of the present invention includes a non-radio-isotopic radiological source comprising: a dense plasma focus (DPF) operably connected to a gas filled medium for producing a column of compressed plasma (z-pinch) along a z-axis and an associated acceleration gradient directed along the z-axis; and a target positioned along the z-axis so as to be impinged by charged particles accelerated by the acceleration gradient of the DPF, wherein said target is of a type which emits ionizing radiation upon impingement by the accelerated charged particles.

Another aspect of the present invention includes a non-radio-isotopic neutron source comprising: a dense plasma focus (DPF) operably connected to a helium gas filled medium for producing a column of compressed $He^{2+}$ ion plasma (z-pinch) along a z-axis and an associated acceleration gradient directed along the z-axis for accelerating the $He^{2+}$ ions as an $He^{2+}$ ion beam along the z-axis; and a beryllium target positioned along the z-axis so as to be impinged by the $He^{2+}$ ion beam, and which emits neutrons having energy spectra similar to an Am—Be source upon impingement by the $He^{2+}$ ion beam.

Another aspect of the present invention includes a non-radio-isotopic radiological source comprising: a first dense plasma focus (DPF) operably connected to a first gas filled medium for producing a column of compressed plasma (first z-pinch) along a z-axis and an associated first acceleration gradient directed along the z-axis; at least one additional DPF coaxially and serially arranged with the first DPF along the z-axis, so as to accelerate the charged particles in multiple DPF stages, each of the at least one additional dense plasma focus (DPF) having an axially aligned tubular anode with opposing inlet and outlet ends and a hollow passage connecting the inlet and outlet ends, and operably connected to a corresponding gas filled medium for producing a corresponding column of compressed plasma (z-pinch) along a z-axis and an associated acceleration gradient directed along the z-axis; and a target positioned along the z-axis adjacent the outlet end of a final one of said multiple DPF stages so as to be impinged by charged particles accelerated by the acceleration gradients of the multiple DPF stages, wherein said target is of a type which emits ionizing radiation upon impingement by the accelerated charged particles.

Generally, the present invention provides a high intensity, simple, compact and rugged non-radio-isotopic radiological source that is based on the pulsed DPF-acceleration of charged particles (ions or electrons) to impact a target and produce ionizing radiation thereby. In this regard, it is appreciated that a radiological source is a source of radiation, in particular ionizing radiation, such as alpha, beta, and gamma rays, and neutron emission, while a radio-isotopic radiological source is a radiological source which produces ionizing radiation based on the radioactive decay of a radioactive material. And as previously described, acceleration gradients of ~100 MV/m have been observed in plasmas produced by DPF-based D-D neutron sources due to non-linear processes. In particular, various mechanisms are considered to be responsible for the acceleration gradients and the observed beams. In particular, it has been proposed that the high electric fields and accelerating voltage in the pinch stem from a combination of the following: 1) inductively through macroscopic fluid motion from pinch formation; 2) inductively through various plasma instabilities during pinch phase; 3) resistively through a large decrease in plasma conductivity due to microscopic instabilities; and 4) shock physics involved in the colliding plasma sheaths. In any case, when operated in the proper fill gas and using the appropriate target, the DPF-accelerated source of the present invention can be a unique pulse-able portable replacement for various types of radio-isotopic sources, such as for example ~Ci or higher actinide-based AmBe neutron sources or ~kCi or higher $^{137}Cs$, $^{60}Co$, $^{192}Ir$ gamma sources, by producing comparable output spectra, i.e. replicating the yield and mean spectra of the ~kCi or higher gamma sources, and the ~Ci or higher AmBe neutron sources.

For example, the DPF-based source of the present invention may be operated in helium gas, to produce and accelerate alpha particles ($He^{2+}$) into a beryllium target and in turn produce neutron emission having energy spectra similar to an AmBe neutron source. The ability of the present invention to replicate an Am—Be source's neutron spectrum based on $^9Be(\alpha, n)^{12}C$ reactions is possible because of its ability to closely generate the 1-to-6 MeV $H^{e2+}$ ions created in a DPF plasma and impacted onto a Be target. In comparison with conventional D-D or D-T neutron tubes operating at ~100 kV and producing ~2.5 or 14.1 MeV neutrons, a DPF-accelerated source with an Am—Be like neutron spectrum would be significantly easier for industry to adapt to. This would allow removing radioactive americium from well logging instruments, while maintaining functionality and traceability to established AmBe-based databases and techniques. The compact and rugged nature of the DPF is also consistent with the hostile environment of well logging activities. It is notable that the DPF beam quality required for replicating a Am—Be neutron spectrum via $^9Be(\alpha, n)^{12}C$ reactions are very low as long as ~MeV $\alpha$'s are made, since the Am radio-nuclei providing the $\alpha$'s in Am—Be sources are emitted isotropically throughout the bulk americium material which leads to energy straggling of the alphas. Also, in terms of initial a energy, the shape of the $^9Be(\alpha, n)^{12}C$ or Am—Be neutron spectrum is determined primarily by the excitation states of the produced $^{12}C$ nuclei and not by the initial $\alpha$ energy, since slowing down of the $\alpha$ in thick Be targets washes out most of the dependence on initial energy. Operating parameters for the DPF accelerator preferably utilize high impedance pulse power drivers, i.e. high voltage (~100 kV or higher), low inductance (~10 nH range), and relatively low capacitance, to maximize the pinch compression and increase the electric field in the pinch. DPF dimensions may be, for example, approximately 1-10 cm long and 1-10 cm diameter. Additionally, operating pressures are preferably at about 1-10 Torr. Example operating parameters for the DPF accelerator when used as a small AmBe neutron source ($10^7$ n/s or 10 Ci) replacement, include ~1 $\mu$A of helium beam at ~3-4 MeV. To increase yield, the uA can be scaled linearly. While a ~10's kJ DPF device is presently able to achieve these parameters, a compact embodiment of the present invention would utilize as low as ~1 kJ DPF for ultra compactness.

In addition to a DPF-accelerated non-radio-isotopic radiological source, a modified DPF having a hollow-anode architecture may also be used as a high gradient particle accelerator. This may be used in the case of e-beam acceleration, which is directed by the electric field towards the anode. By providing for a hollow passage through the anode, electrons may be accelerated by the DPF in an opposite direction of ion acceleration, so as to impinge a high Z target and produce x-rays/gamma.

Furthermore, multiple DPF stages may also be provided by axially stacking two or more DPFs in series, so that charged particles may be accelerated in stages. Similar to the single stage DPF, multiple DPF staged acceleration may also be employed for both ion and electron acceleration.

BRIEF DESCRIPTION OF THE DRAWINGS

The accompanying drawings, which are incorporated into and form a part of the disclosure, are as follows.

DETAILED DESCRIPTION

Figure 1:
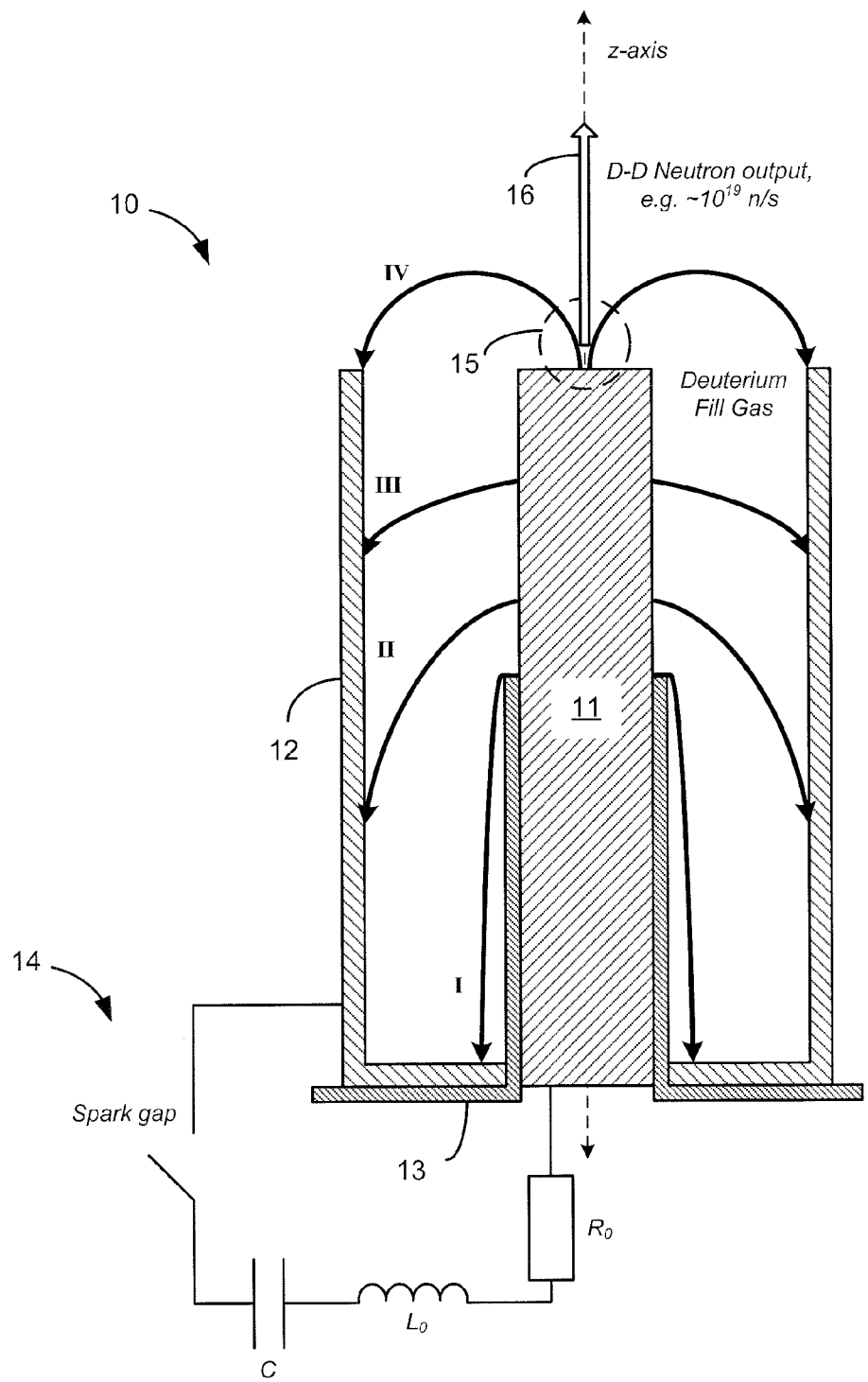
FIG. 1 is a schematic cross-sectional view of a typical DPF geometry and operation known in the art for D-D neutron generation using deuterium fill gas.
Figure 2:
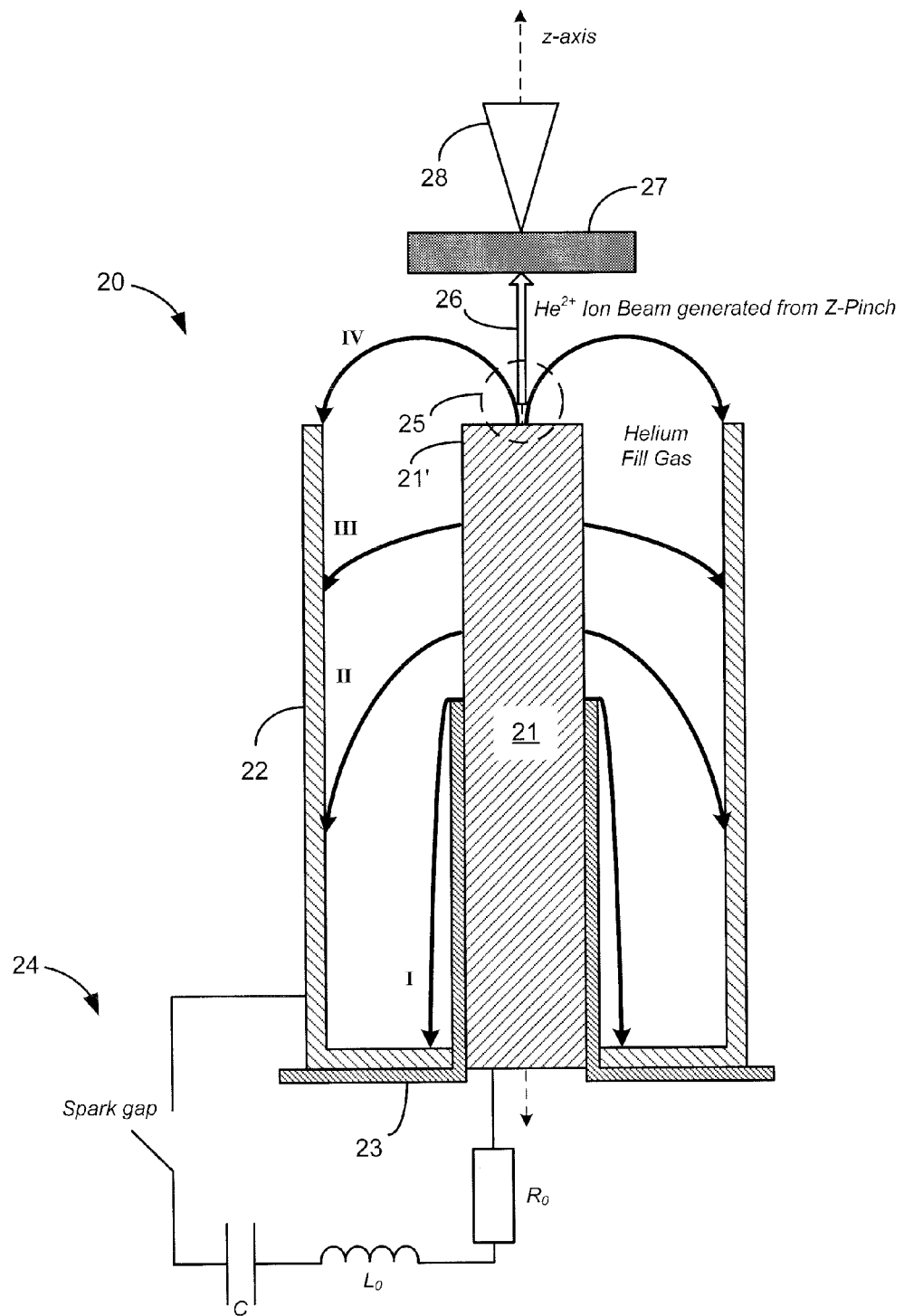
FIG. 2 is a schematic cross-sectional view of a first exemplary embodiment of the radiological source of the present invention, and configured as a neutron source with energy spectra similar to an AmBe source.

Turning now to the drawings, FIG. 2 shows a schematic cross-sectional view of a first exemplary embodiment of the DPF-accelerated, non-radio-isotopic, radiological source of the present invention, generally indicated at reference character 20. In particular, the radiological source is shown configured as a neutron source to produce neutrons having energy spectra similar to an AmBe source. For this purpose a beryllium target 27 is shown positioned along a z-axis. And a dense plasma focus (DPF) is provided having a conventional Mather-type architecture including an elongated central anode 21, a coaxially aligned outer cathode 22 positioned around and spaced from the anode, and a coaxially aligned dielectric 23 for insulating between the anode and cathode. Furthermore, a pulse generator 24 is provided connected to the anode and cathode, and simplistically represented by a circuit with a spark gap, capacitor, inductor, and resistor. It is appreciated that various types of pulse generators and pulse forming networks may be utilized as known in the art. In operation, the DPF produces a z-pinch, indicated at region 25 at a tip end 21' of the anode, in a manner earlier described and known in the art. In particular, and similar to the DPF operation of FIG. 1, the plasma sheaths (I) to (IV) illustrate the formation of the plasma from flashover of the insulator (I), followed by the sheet propagation (II, III) through collapse of the current sheets (IV) to form the pinch 25. However, the DPF of FIG. 2 preferably operates in a helium fill gas medium, so that formation of the z-pinch 25 produces a $He^{2+}$ ion beam 26 with MeV level energies that is axially directed along the z-axis and toward the beryllium target 27. Upon impinging the beryllium target 27, neutrons 28 are generated with energy spectra similar to an AmBe source. It is appreciated that various dielectric material types may be used for the coaxial insulators 23, such as for example quartz (substantially equivalent to the material sold under the trademark "Pyrex"), glass, and alumina. Similarly, various types of conductive materials may be used for the electrodes, such as for example tungsten, silver, copper, iron, titanium, aluminum, and graphite, with tungsten typically exhibiting the greatest erosion resistance against material getting into the plasma.

Figure 3:
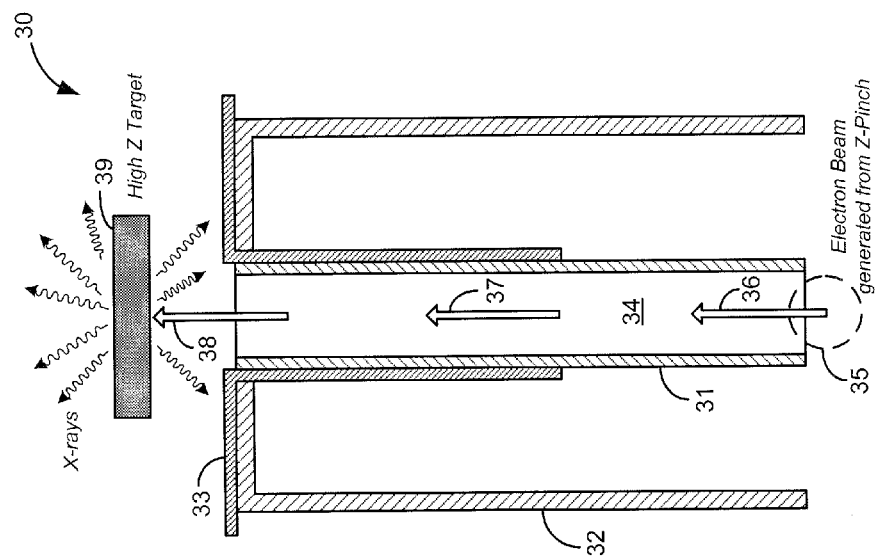
FIG. 3 is a schematic cross-sectional view of a second exemplary embodiment of the radiological source of the present invention, configured as an X-ray source by generating an e-beam from the Z-pinch, and directing the e-beam through a hollow tubular anode to a high Z target.

FIG. 3 is a schematic cross-sectional view of a second exemplary embodiment of the radiological source of the present invention, generally indicated at reference character 30, and including a DPF and a high Z target 39, such as for example Cu, Ta, Pb, and Tungsten. While not shown, a pulse forming line or network is also provided for supplying pulse power to the DPF, and connected to the anode 31 and cathode 32 in a manner similar to FIG. 2, with insulator 33 coaxially separating the anode and cathode. As shown in FIG. 3, the DPF-accelerated radiological source 30 is particularly configured as an x-ray/gamma source by generating an e-beam 36 from the z-pinch 35 at a tip end of the anode (adjacent open end of the cathode 32). The anode 31 is preferably a hollow tubular structure having a hollow passage 34 connecting opposing inlet and outlet ends of the anode. Because the radiological source 30 in FIG. 3 is configured as an x-ray/gamma source, the pinching tip end of the anode where the z-pinch is formed is considered the inlet end since electrons are accelerated from the z-pinch into the hollow passage 34 of the anode 31, where it is shown drifting through the hollow passage space, and exiting the outlet end at arrow 38 to strike the high Z target.

Figure 4:
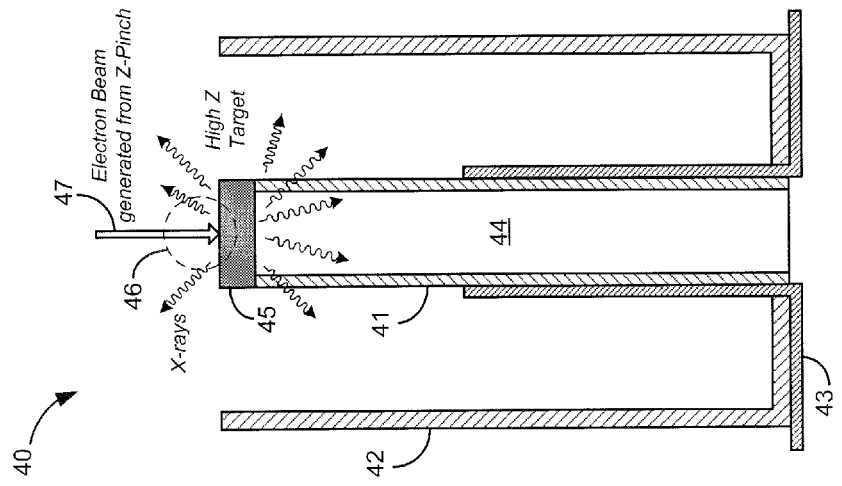
FIG. 4 is a schematic cross-sectional view of a third exemplary embodiment of the radiological source of the present invention, configured as an X-ray source by generating an e-beam from the Z-pinch, and directing the e-beam towards the anode tip constructed of a high Z target material.

FIG. 4 is a schematic view of a third exemplary embodiment of the radiological source of the present invention, configured as an x-ray source by generating an e-beam 47 from the z-pinch 45 at a tip end of the central/inner anode 41 (adjacent the open end of the cathode 42, and directing the e-beam to strike the anode tip end constructed of a high Z target material 47. Similar to FIG. 3, the anode 41 is also shown having an axially aligned hollow cavity 44, to enable the x-ray generation from the high Z target. It is notable that in both FIGS. 3 and 4, the e-beam is directed back towards the anode and the DPF due to the direction of the electric field lines, whereas ion beams are accelerated away from the anode and DPF, as shown in FIG. 2.

FIGS. 5-9 show various embodiments of DPF-accelerated non-radio-isotopic radiological source of the present invention which have in common the use of an independent particle injector for injecting charged particles into a modified DPF having an axially aligned, hollow anode so as to further accelerate the charged particles by the DPF and gain more energy before impinging a target.

Figure 5:
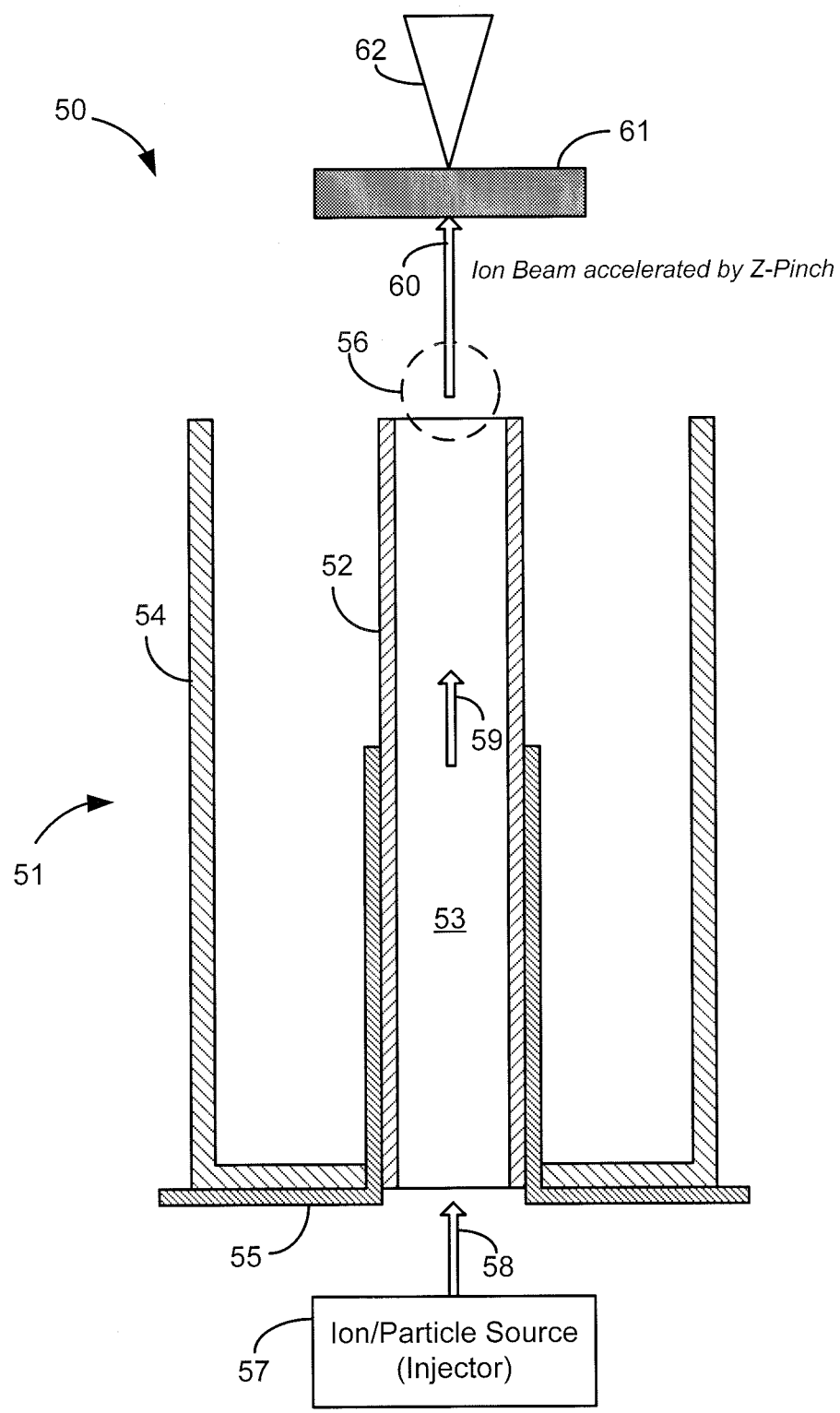
FIG. 5 is a schematic cross-sectional view of a fourth exemplary embodiment of the radiological source of the present invention, having a DPF with a hollow tubular anode for accelerating an ion/particle beam injected from an external ion/particle source.

In particular FIG. 5 shows a schematic view of a fourth exemplary embodiment of the DPF-accelerated non-radio-isotopic radiological source of the present invention, generally indicated at 50 having a DPF 51 with an axially aligned hollow tubular anode 52 for accelerating an ion/particle beam 58 injected from an external ion/particle source 57 into a hollow passage or cavity 53 of the anode. An insulator 55 is shown provided electrically separating the anode 52 from the cathode 54. As can be seen, the ion beam 58 enters the inlet end of the anode 52 which is the end opposite the z-pinch and the tip end of the anode. In operation, the injected ion beam 58 enters the hollow passage 53 where it drifts in the drift space prior to being accelerated by the electric field formed in the z-pinch 56, as indicated by elongated arrow beam 60 which is shown impinging on the target 61 to produce a corresponding ionizing radiation, e.g. neutron emission.

Figure 6:
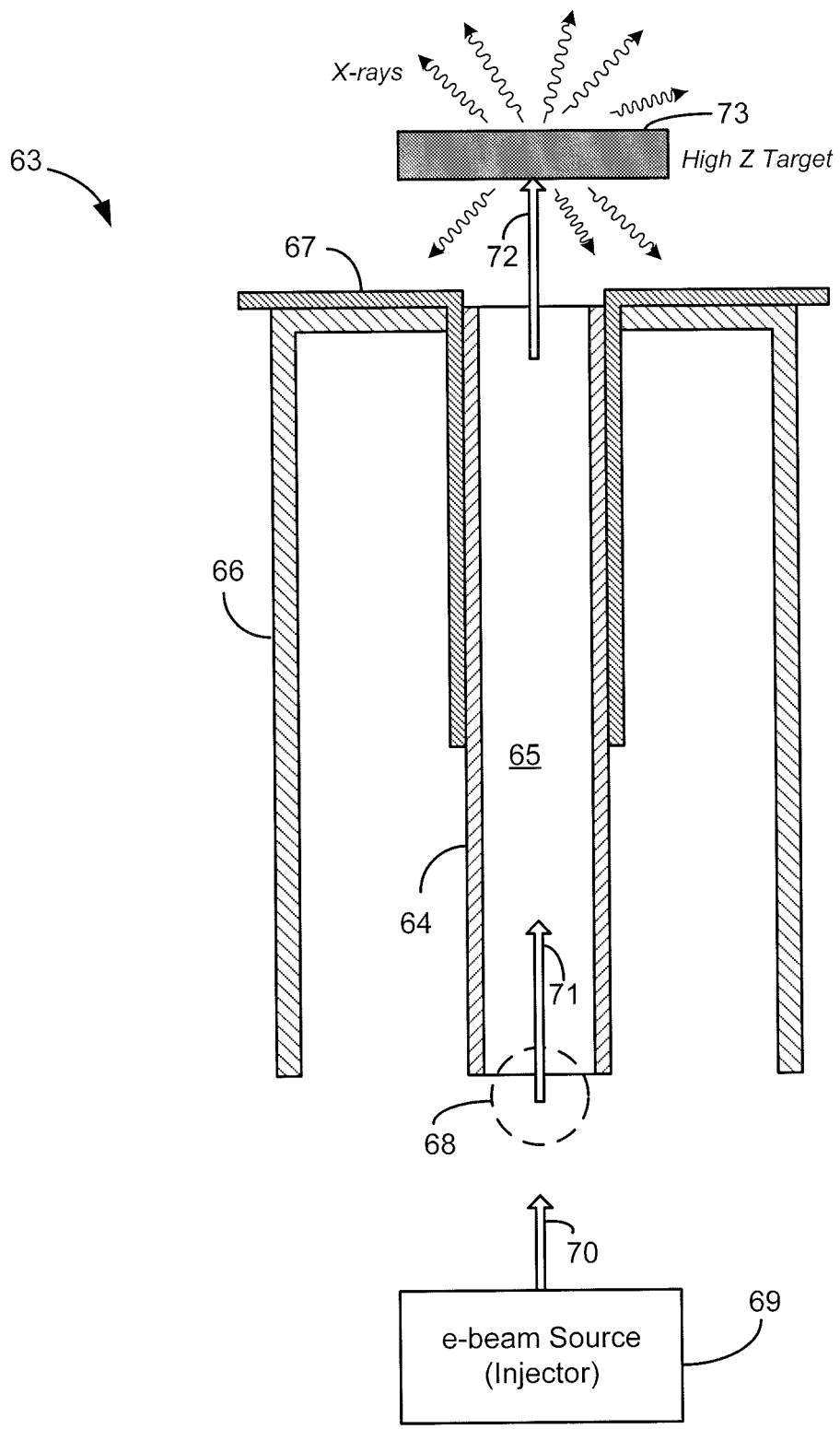
FIG. 6 is a schematic cross-sectional view of a fifth exemplary embodiment of the radiological source of the present invention, having a DPF with a hollow tubular anode for accelerating an e-beam injected from an external e-beam source.

And FIG. 6 is a schematic view of a fifth exemplary embodiment of the DPF-accelerated non-radio-isotopic radiological source of the present invention, having a DPF with an axially aligned hollow tubular anode 64 surrounding a hollow passage 65, for accelerating an e-beam 70 which injected from an external e-beam source 69. Here too, the DPF configuration is generally similar to the Mather type construction, having a central/inner anode and a coaxial outer cathode 66 with a coaxial insulator 67 between. In operation, the injected beam 70 is accelerated in the z-pinch 68 as it passes therethrough, as shown by beam 71. The beam 71 enters the hollow passage 65 (e.g. drift space) from the inlet end, and out the outlet end as accelerated e-beam 72. The accelerated e-beam 72 is shown impinging/striking a high Z target 73 to produce x-rays.

Figure 7:
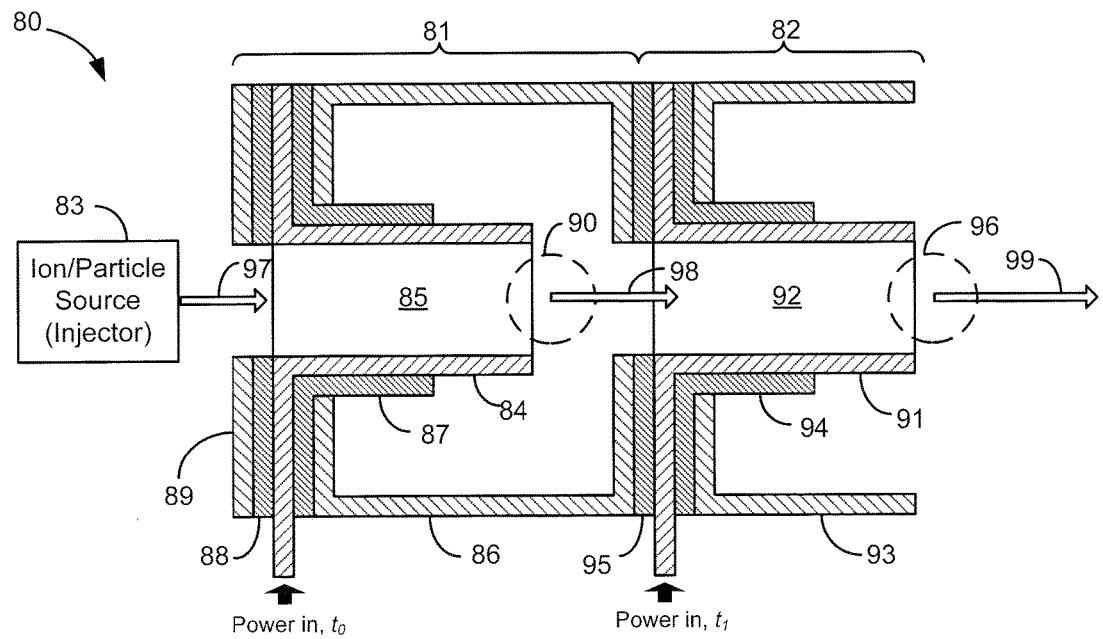
FIG. 7 is a schematic cross-sectional view of an exemplary ion/particle source and multi-stage DPF accelerator arrangement which may also be used as part of the radiological source of the present invention.
Figure 8:
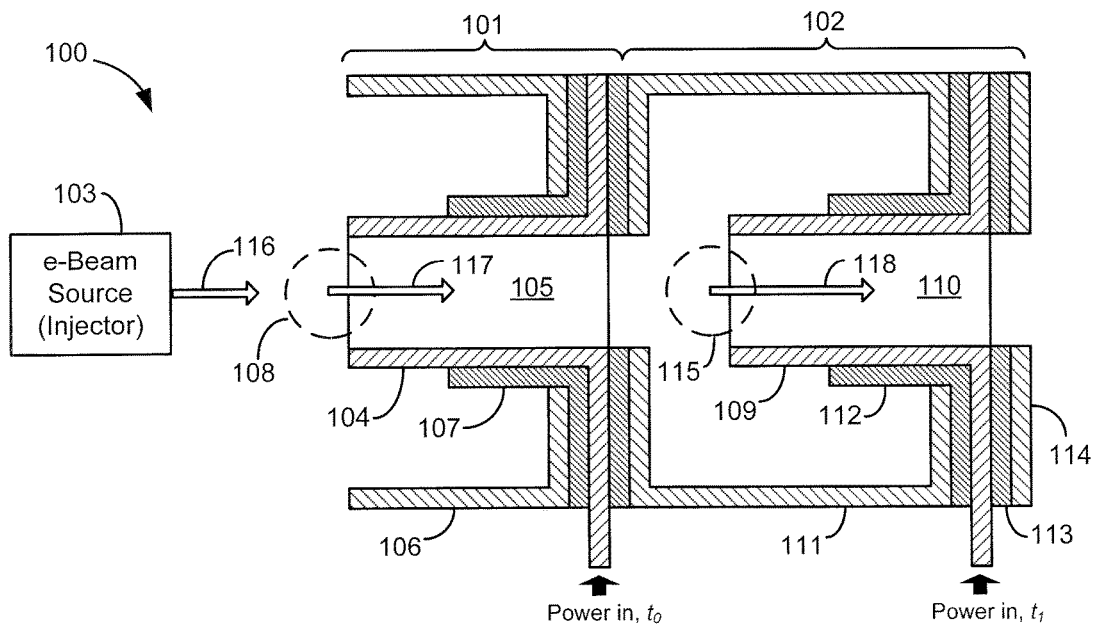
FIG. 8 is a schematic cross-sectional view of an exemplary e-beam source and multi-stage DPF accelerator arrangement which may also be used as part of the radiological source of the present invention.
Figure 9:
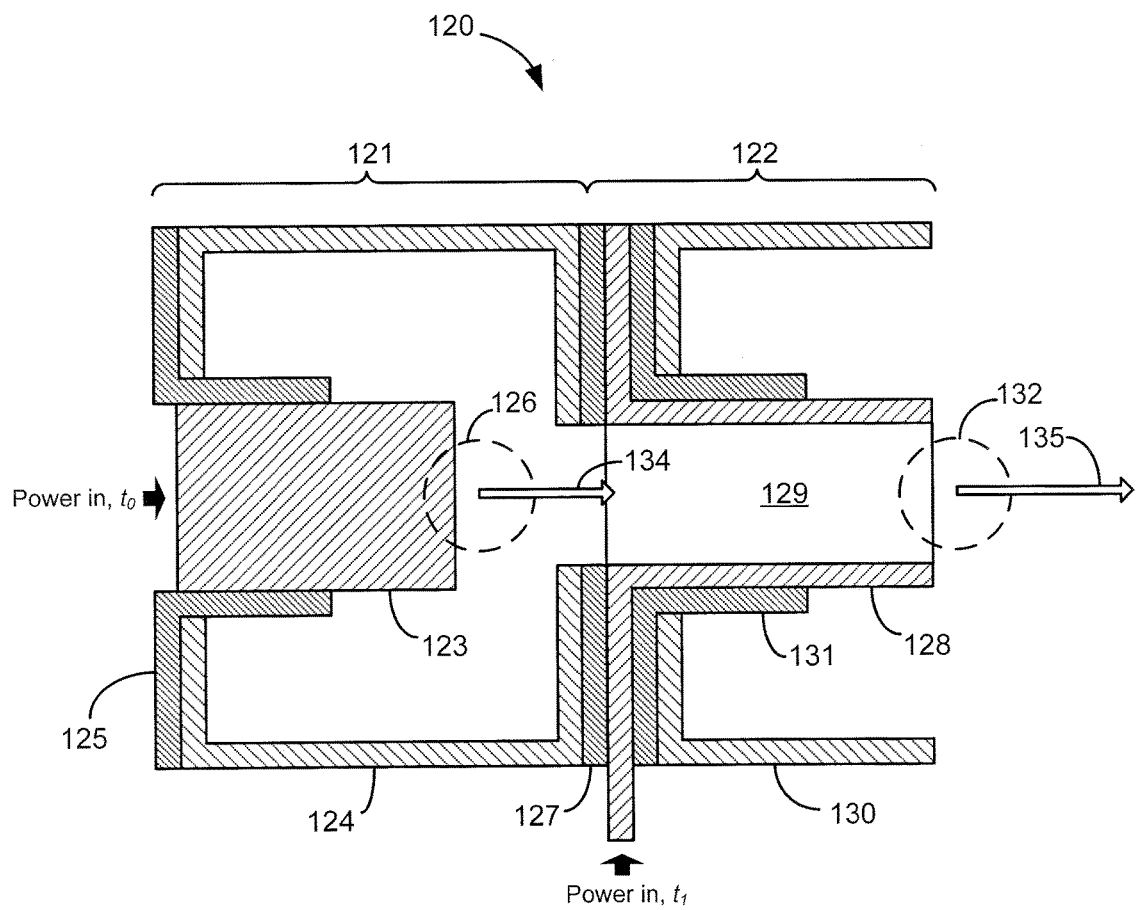
FIG. 9 is a schematic cross-sectional view of an exemplary multi-stage DPF accelerator arrangement having a first DPF stage which operates as an ion source, and a second DPF stage for accelerating the ions generated by the first DPF stage.

And FIGS. 7-9 show several exemplary multi-stage acceleration and multi-DPF embodiments of the present invention, which are enabled by the hollow passage anode of at least one or more of multiple stacked DPFs. Through staged acceleration of independently injected beams by multiple stacked DPFs, it would be possible to scale to higher and mono-energetic beam output. In a multi-DPF setup device timing of the pulsed operation of the DPFs would be provide by suitable pulse forming network and switch control electronics known in the art, and DPFs with short anodes would be preferred to maximize effective acceleration gradients.

In particular, FIG. 7 is a schematic view of an exemplary ion/particle source and multi-stage DPF accelerator arrangement which may also be used as part of a non-radio-isotopic radiological source of the present invention upon providing a target of a type known to produce ionizing radiation upon being impinged by the type of accelerated charged particles. An independent ion/particle source is shown at 83 for injecting an ion beam 97 into an inlet end of a first stage DPF 81. The first stage DPF 81 is shown having a hollow tubular anode 84 with a hollow passage 85, a coaxial cathode 86, and an insulator 87 electrically separating the anode and cathode. Furthermore, at the inlet end of the first stage DPF 81, a grounded layer 89 is provided as an external cap layer 89, while an insulator 88 electrically separates the grounded external cap layer 89 from the anode 84. And a second stage DPF is shown at 82 also having a similar dimensions and structure as the first stage, and including a hollow tubular anode 94 with a hollow passage 92, a coaxial cathode 93, and an insulator 94 electrically separating the anode and cathode, typical of a Mather type DPF. The inlet end of the second stage DPF 82 is axially aligned with the outlet end of the first stage DPF, with a insulator layer 95 electrically separating the two stages. In operation, the ion/particle beam 97 generated by the ion/particle source injector 83 is injected into the inlet end of the first stage DPF 81 where it is accelerated by the z-pinch acceleration field at 90, as indicated by the longer beam 98. The beam 98 then passes through the hollow passage 82 of the second stage DPF 82 until it reaches the outlet end where a second z-pinch is formed at 96, to further accelerate the beam, as indicated by even longer beam 99. Each of the anodes for the first and second stages are shown connected to power inputs, and configured to receive power at different times $t_0$ and $t_1$.

FIG. 8 is a schematic view similar to FIG. 7, but showing an exemplary e-beam source and multi-stage DPF accelerator arrangement which may be also used as part of the radiological source of the present invention. Two DPF stages are also shown at 101 and 102. And an e-beam source injector is provided at 103 for injecting a e-beam 116 into the first stage DPF. The first stage DPF 101 is show in a horizontally reversed orientation compared with FIG. 7, to account for the acceleration of e-beams in a reverse direction to that of ion beams. In any case, the first DPF stage 101 is shown having a hollow tubular anode 104 surrounding a hollow passage 105, a coaxial outer cathode 106, and a coaxial insulator 107 separating the anode and cathode. And the second stage DPF 102 is also has a similar construction with a hollow tubular anode 109 surrounding a hollow passage 110, a coaxially aligned cathode 111, and an insulator 112 electrically separating the two. Similar to FIG. 7, an insulator 113 and a grounded cap layer 114 is provided so as not to expose the anode 112. Operation is similar to FIG.

7, where and e-beam is generated at 116 by injector 103, where it is accelerated in the z-pinch 117, and passed into the second stage DPF where it is accelerated again in the z-pinch 115 at a later time. The progression of increasing beam energy can be seen by the beam elongation through the stages. It is appreciated that the beam 118 exiting the second stage DPF 102 may be impinged on a high Z target for x-ray/gamma emission, or further accelerated in additional DPF stages, not shown.

And finally, FIG. 9 is a schematic cross-sectional view of an exemplary multi-stage DPF accelerator arrangement, generally indicated at 120, having a first DPF stage 121 which operates as an ion source, and a second DPF stage 122 for accelerating the ions generated by the first DPF stage. In this embodiment, ions are not produced by an external ion source/injector, but is rather generated by the first stage DPF 121in a manner similar to that shown in FIG. 2 of the present invention. The first stage DPF is shown having a solid central/inner anode 123, a coaxially aligned outer cathode 124, and a coaxial insulator 125 separating the two electrodes. In contrast, the second stage DPF 122 has a hollow tubular anode 128 surrounding a hollow passage 129, a coaxially aligned cathode 130, and insulator 131. With this configuration, ions are generated by operation of the first stage DPF and formation of the z-pinch 126 from the fill gas and associated acceleration gradient. The accelerated ion beam generated by the z-pinch 126 is shown at 134, where it enters the inlet end and exits the outlet end of the second stage DPF anode, where it encounters a second acceleration when z-pinch 132 is produce. The increase in beam energy is indicated by elongated beam 135.

It is appreciated that the single stage DPF embodiments of FIGS. 5 and 6 as well as the modular, multi-stage/multi DPF embodiments shown in FIGS. 7-9 effectively provide high gradient accelerators using DPF plasmas to accelerate charged particles, and preferably permit for each stage, the transport and acceleration of an independently injected beam in the ~10-100 MeV range. Such compact high-gradient accelerators can be used to provide intense compact and highly directional neutron source through not only conventionally kinematically directed p-Li or D-D reactions, but strongly directed beams accessible by using accelerated light ions inverse reaction kinematics. In general, this technology would permit intense compact x-ray, particle beam, and non-radiological-based neutron sources. Such high gradient plasma accelerators could potentially be used to make any alternate radiological source requiring ~MeV level (ion or electron) beams compact. And the final Z-pinch stage of a Dense Plasma Focus (DPF) could be used as a simple, compact, and potentially rugged plasma-based high-gradient particle accelerator with fields at the 100 MV/m level, for a broad range of applications, such as from remote detection of nuclear and explosives materials to radiotherapy in health care.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A non-radio-isotopic radiological source comprising:
a dense plasma focus (DPF) operably connected to a gas filled medium for producing a column of compressed plasma (z-pinch) along a z-axis and an associated acceleration gradient directed along the z-axis; and
a target positioned along the z-axis so as to be impinged by charged particles accelerated by the acceleration gradient of the DPF, wherein said target is of a type which emits ionizing radiation upon impingement by the accelerated charged particle,
wherein the DPF is operably connected to a helium gas medium for producing a $He^{2+}$ ion z-pinch that is accelerated along the z-axis as a $He^{2+}$ ion beam, and
wherein said target is beryllium which emits neutrons having energy spectra similar to an Am—Be source of about 1-5 MeV upon impingement by the $He^{2+}$ ion beam.

2. The non-radio-isotopic radiological source of claim 1, wherein said DPF has an axially aligned tubular anode with opposing inlet and outlet ends and a hollow passage connecting the inlet and outlet ends.

3. The non-radio-isotopic radiological source of claim 2, wherein the z-pinch and the associated acceleration gradient is produced adjacent the outlet end of the DPF anode, and the target is adjacent the outlet end; and
further comprising an ion/particle beam source positioned to inject an ion/particle beam into the inlet end of the anode, through the hollow passage, and out the outlet end, so as to be further accelerated by the acceleration gradient at the outlet end before impinging the target.

4. The non-radio-isotopic radiological source of claim 2, wherein the target is a high Z target, the z-pinch and the associated acceleration gradient is produced adjacent the inlet end of the DPF anode, and the target is adjacent the outlet end so that an e-beam accelerated at the inlet end is directed into the inlet end, through the hollow passage, and out the outlet end for impingement on the high Z target.

5. The non-radio-isotopic radiological source of claim 4, further comprising an e-beam source positioned to inject an electron beam into the inlet end so as to be further accelerated by the acceleration gradient at the inlet end prior to entering the inlet end, through the hollow passage, and out the outlet end for impingement on the high Z target.

6. The non-radio-isotopic radiological source of claim 1, wherein said DPF has an axially aligned tubular anode surrounding a hollow cavity, and the target is a high Z target forming an end of the anode adjacent the z-pinch, so that an e-beam is accelerated towards the anode to impinge the high Z target.

7. The non-radio-isotopic radiological source of claim 2, further comprising:
at least one additional DPF coaxially stacked with the DPF along the z-axis, so as to accelerate the charged particles in multiple DPF stages as they pass through the hollow passages.

8. The non-radio-isotopic radiological source of claim 7, wherein each of the multiple DPF stages has an axially aligned tubular anode with opposing inlet and outlet ends and a hollow passage connecting the inlet and outlet ends, and
further comprising a ion/particle source for injecting an ion/particle beam into a first stage of said multiple DPF stages.

9. The non-radio-isotopic radiological source of claim 7, wherein a first stage of said multiple DPF stages generates the charged particles from the gas.

10. A non-radio-isotopic neutron source comprising:
a dense plasma focus (DPF) operably connected to a helium gas filled medium for producing a column of compressed $He^{2+}$ ion plasma (z-pinch) along a z-axis and an associated acceleration gradient directed along the z-axis for accelerating the $He^{2+}$ ions as an $He^{2+}$ ion beam along the z-axis; and a beryllium target positioned along the z-axis so as to be impinged by the $He^{2+}$ ion beam, and which emits neutrons having energy spectra similar to an Am—Be source upon impingement by the $He^{2+}$ ion beam.

\* \* \* \* \*